Figure 1:
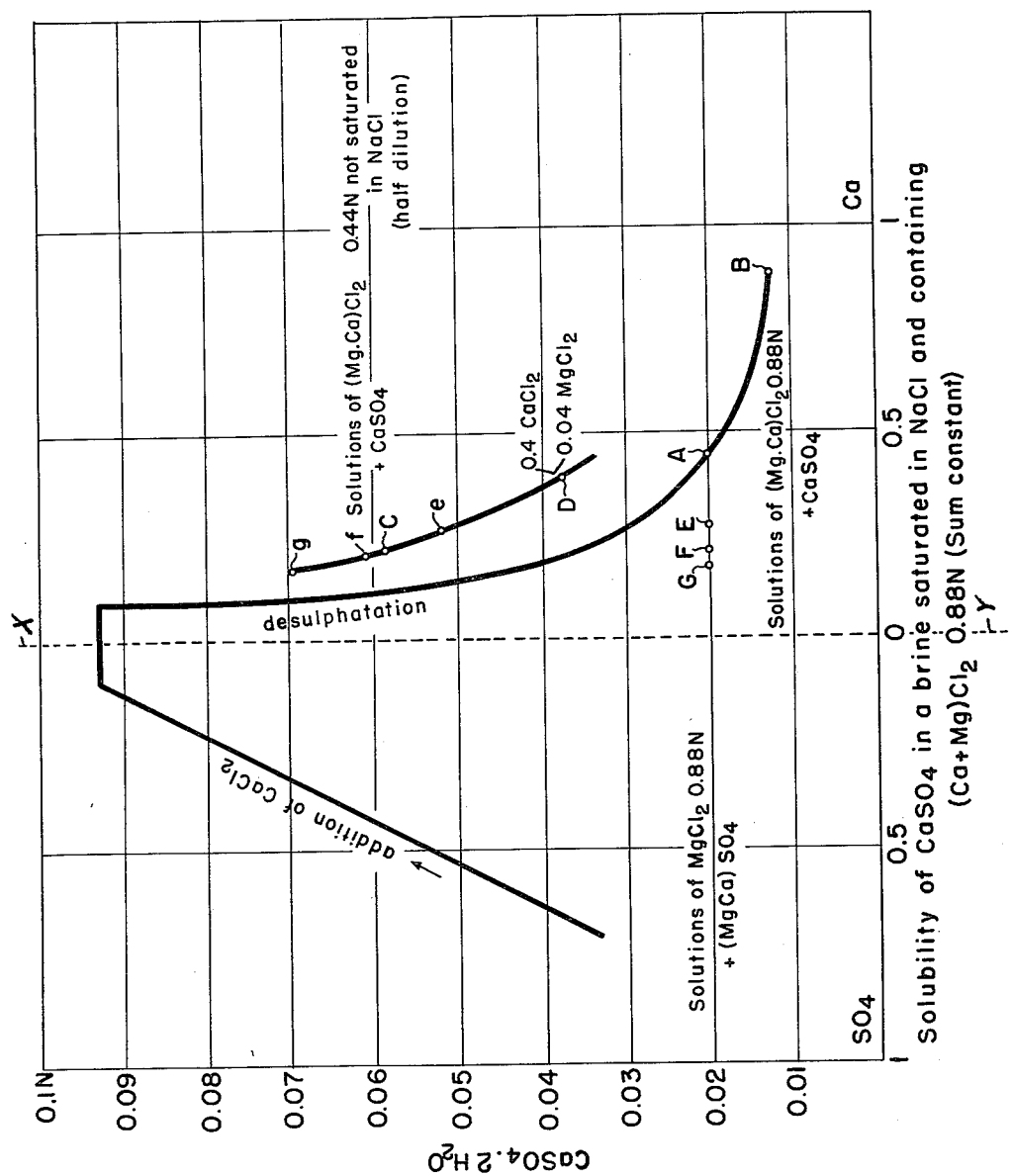

INVENTOR.
Andre Sable
BY
Webb, Mackey + Burden
HIS ATTORNEYS

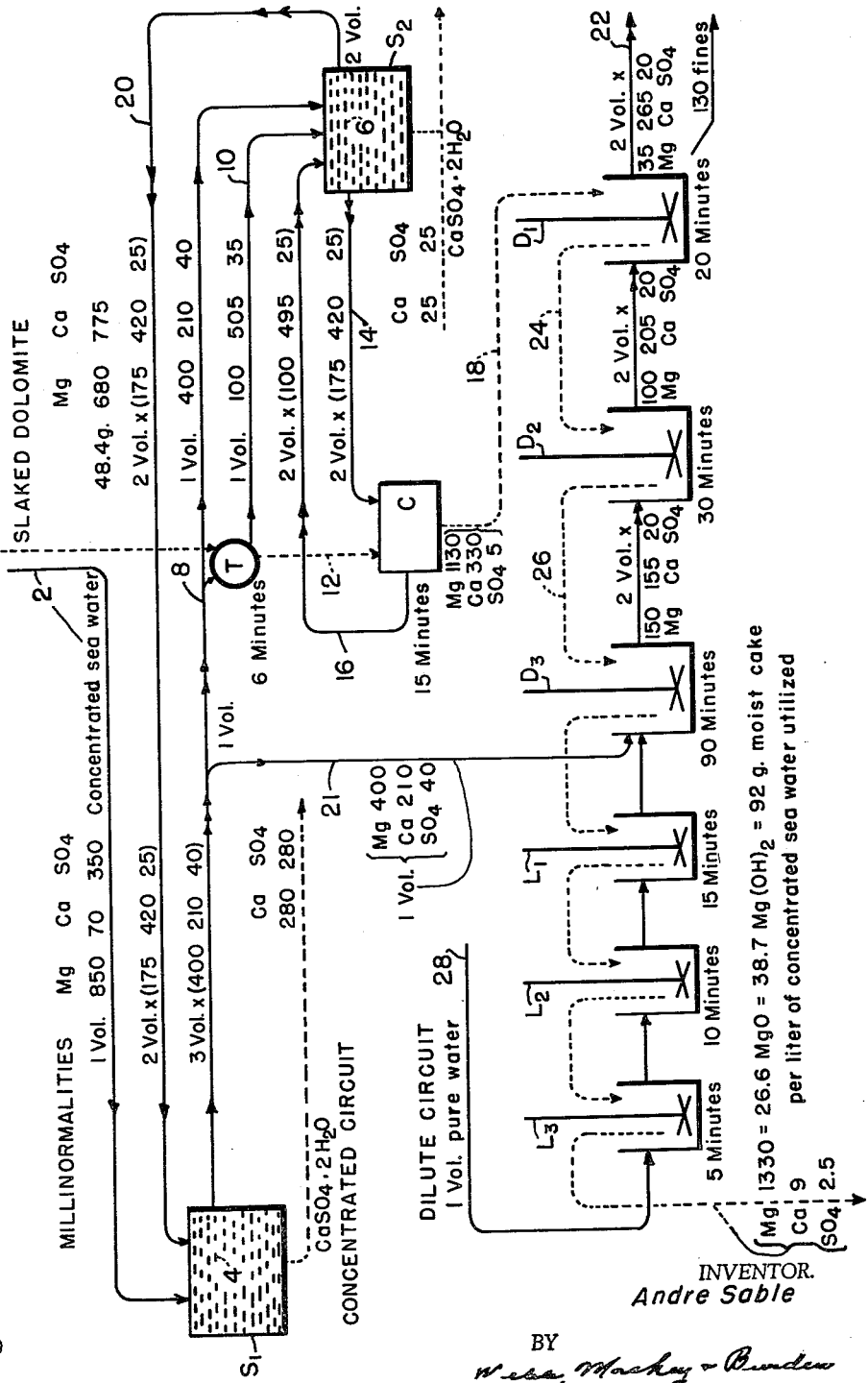

3,051,552
PROCESS FOR THE CONVERSION OF DOLOMITE
André Sablé, Marseille, France, assignor to Societe d'Electro-Chimie d'Electro-Metallurgie et des Acieries Electriques d'Ugine, Paris, France, a corporation of France
Filed June 30, 1959, Ser. No. 824,082
Claims priority, application France July 2, 1958
3 Claims. (Cl. 23—201)

This invention relates to the process for the conversion of dolomite.

Certain magnesium-containing brines saturated in NaCl, such as concentrated sea water or water from salt marshes, constituted for the most part of chlorides, may contain as much as 40% of their magnesium content in the form of sulphate and, for that reason, their utilization as a source of magnesium or as an agent in the conversion of slaked dolomite raises, because of this fact, a certain number of problems.

The known processes lead to the production of magnesium hydrate contaminated with calcium sulphate.

The conversion of slaked calcined dolomite according to the equation:

(A)
$$Ca(OH)_2Mg(OH)_2 + MgCl_2 = 2Mg(OH)_2 + CaCl_2$$

gives residuary brines containing calcium chloride and for a long time attention has been given to utilizing such residuary brines for converting magnesium sulphate into magnesium chloride and eliminating a portion of the sulphate in an insoluble form according to the equation:

(B)
$$MgSO_4 + CaCl_2 + Aq = CaSO_4.2H_2O + MgCl_2$$

By recycling residuary brines according to Equation B, it is theoretically possible to obtain a brine which contains magnesium only in the form of chloride and contains only the $SO_4$ ions corresponding to the solubility of $CaSO_4.2H_2O$ in the brine. Now the measurements effected by applicant have proved that said solubility, for a brine containing neither $SO_4$ nor Ca ions in excess of the stoichiometric formula $CaSO_4$, is at 20° C. about 0.09 normality, that is:

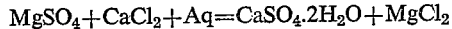

$= 7.75$ grams/liter of $CaSO_4.2H_2O$ or 2.52 grams per liter of CaO. The $MgCl_2$ in solution (0.88 normality) in a magnesium brine corresponding, for example, to concentrated sea water contains about 17.6 grams per liter of MgO. Thus, the CaO in solution in the form of $CaSO_4$ represents $$\frac{2.52}{17.6}$$

i.e., 14 to 15% by weight of the MgO to be extracted.

If, during the conversion according to Equation A, the solubility of gypsum (crystallized $CaSO_4.2H_2O$) in the brine remained unchanged, the sulphate concentration remaining unchanged, it would be possible theoretically to avoid the precipitation of CaO (in the form of sulphate) with the precipitation of the $Mg(OH)_2$. But this is not the case. Applicant's work has shown that as the brine becomes richer in $CaCl_2$ according to Equation A, the solubility of $CaSO_4.2H_2O$ decreases by homoionic effect to a value of 0.012 normality in $SO_4$ (therefore in $CaSO_4.2H_2O$) at the end of the operation. Therefore, if all of the Mg in solution, that is, as hereinabove indicated, about 17.6 grams MgO per liter, is precipitated, the corresponding enriching of the brine in $CaCl_2$ causes a loss of solubility of the $SO_4$ ions from 0.09 to 0.012=0.078 normality, that is, 2.2 grams CaO as sulphate, or 12.5% of the weight of MgO precipitated from the brine. Now this CaO content of 12.5% would still render the $Mg(OH)_2$ unfit for most of its industrial uses.

The curves of FIGURE 1 show the variations of the solubility of $CaSO_4.2H_2O$ in the brine considered. The excesses in $SO_4$ (shown at the left of the line XY), stated in normalities compared to the formula $CaSO_4.2H_2O$, are represented in abscissas; the concentrations in $CaSo_4.2H_2O$, also stated in normalities, are represented in ordinates.

The left side of FIGURE 1 corresponds to the transformation of $MgSO_4$ into $MgCl_2$ according to Equation B, i.e., by addition of $CaCl_2$ to the initial brine. $SO_4$ ions are precipitated from the solution as $CaSO_4.2H_2O$ but the effect of the decrease in concentration of $SO_4$ ions in the solution resulting from this precipitation is to increase the solubility of the gypsum by decreasing the homoionic effect $SO_4-SO_4Ca.2H_2O$.

As shown on the right-hand portion of FIGURE 1, when all of the $MgSO_4.2H_2O$ has been transformed, the added $CaCl_2$ remains in the solution and acts by homoionic effect $Ca^{++}SO_4Ca.2H_2O$. As the concentration in $CaCl_2$ increases, the gypsum solubility decreases.

In order to limit the CaO precipitating as sulphate with the magnesum hydroxide, it is advantageous, as shown on the right portion of FIGURE 1, to introduce, preferably by partial recycling of the exhausted brines to the initial brines, a strong excess of $CaCl_2$ which, without precipitating any magnesium, dilutes and gives a brine containing, for example, as much as $CaCl_2$ as $MgCl_2$ $$(0.44MgCl_2 + 0.44CaCl_2)$$

and wherein the calcium sulphate solubility is only 0.02 normality (point A of the curve). Then the excess of calcium sulphate is eliminated by crystallization of

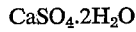

and the liquors are treated so as to precipitate the magnesium. Now, after complete precipitation of the magnesium, the $CaSO_4$ solubility in the residuary waters lowers to only 0.012 normality (point B). In consequence, the solubility loss is only 0.02−0.012=0.008 normality, that is, 0.225 gram CaO per liter for 8.8 grams precipitable MgO per liter, i.e., a ratio CaO/MgO=2.5% instead of 12.5%, but this, however, is still too high.

Of course, it would be possible to go still further by recycling more brine. However, the curves show that only small gains in CaO precipitated as sulphate per unit of MgO produced may be obtained, and this is at the cost of a substantial decrease in yield per unit of volume of treated brine.

Now, applicant has also found that:
(1) When disposing of a brine rich in $CaCl_2$, such as described hereinabove, containing, for instance, $MgCl_2=0.44$   $CaCl_2=0.44$   $CaSO_4=0.02$ normality and saturated in NaCl, if said brine is diluted with water, the $CaSO_4$ solubility is strongly increased. For example, for a 1:1 dilution, the solubility becomes 0.058 normality (point C) and, if the magnesium from said diluted brine is precipitated according to Equation A, e.g., up to $MgCl_2=0.04$  $CaCl_2=0.40$ (point D), the solubility of $CaSO_4$ is still 0.036 normality, that is much higher than the initial $CaSO_4$ content of the brine before dilution, or 0.02 normality before dilution (point A) which, after dilution, has become 0.01 normality. Consequently, the magnesium precipitation may be realized without any risk of contaminating the precipitate by the CaO in the form of $CaSO_4$.

(2) The diluted brines hereinabove described are not suitable for the desulphating. Effectively, the gypsum crystallization must be carried out in a medium concentrated in $CaCl_2$ and saturated in NaCl if small contents of $CaSO_4$ corresponding to point A are desired. But on the other hand, the make-up $CaCl_2$ may be extracted in concentrated medium from a cycle similar to the one described in Example III of applicant's copending application Serial No. 821,399, filed June 19, 1959, entitled "Process for the Conversion of Dolomite," now Patent No. 2,033,650. This process consists in soaking and counterflow converting slaked dolomite with a magnesium brine saturated in NaCl. This process is suitable for brines free from sulphate. If, as in the present case, the utilized brines contain sulphates, part of the process may nevertheless be used with no risk of contaminating the $Mg(OH)_2$ due to the inertia of calcium sulphate molecules in precipitating in this medium as $CaSO_4.2H_2O$ crystals.

The present invention concerns a process for the conversion of slaked dolomite by brines containing $MgCl_2$ saturated in NaCl and comprising, besides chlorides, a noticeable proportion of sulphates, which consists in:

(a) Desulphating these brines by mixing them with concentrated saline solutions from recycling rich in $CaCl_2$, without lowering the NaCl content of the mixture, in order to take advantage of the low solubility of calcium sulphate in a concentrated medium;

(b) Preparing recycling solution by carrying out the first steps of the dolomite conversion into $Mg(OH)_2$ by $MgCl_2$ in a concentrated brine and avoiding the contamination of $Mg(OH)_2$ by calcium sulphate, thanks to the inertia of gypsum in crystallizing in said medium;

(c) Eliminating the calcium sulphate by precipitation in devices distinct from the converters;

(d) Diluting the desulphated brine; and (e) Completing the counterflow conversion of dolomite by taking advantage of the fact that the solubility of calcium sulphate increases with dilution and thus avoids contamination of the magnesium hydroxide by calcium sulphate.

The invention consists also, as indicated hereinafter, in combining these diverse operations in one complex cycle comprising at least two circuits, one of which at least utilizes concentrated brine and another one diluted brine, for instance, by incorporating washing water.

The combination of the two processes described hereinabove in (1) and (2) leads effectively to a complex cycle, wherein the last steps of conversion are realized, as indicated in (e), in diluted medium, preferably by mixing washing waters of the final product with desulphated brine, and wherein the first step, or steps, works as indicated in (b) in concentrated medium.

In these steps, the passage into solution of $CaCl_2$ from the reaction of $MgCl_2$ on the lime from dolomite according to Equation A, as shown on the right portion of the curves of FIGURE 1, lowers the $CaSO_4$ solubility and the brines, already saturated, in $CaSO_4$, become supersaturated. But applicant has observed that, in said brines, most charged indeed in various ions but wherein the concentration in $SO_4$ ions is only a few centinormalities, the appearance of the first $CaSO_4.2H_2O$ crystals generally requires delays of about one or several hours, while the contact with the dolomite during the conversion lasts only about a quarter of an hour at the first steps of conversion. However, the $CaSO_4.2H_2O$ supersaturated at each passage being eliminated by crystallization, each step utilized as a source of $CaCl_2$ in concentrated medium is doubled with a desulphater in which the supersaturated brine is brought into contact with $CaSO_4.2H_2O$ nucleus crystals, and this long enough to destroy the supersaturation. The first desulphater is also used for the precipitation, as calcium sulphate, of most of the $SO_4$ ions brought along by the primary brine.

Therefore, the concentrated brine saturated in NaCl circulates in closed circuit in each system: converter, desulphater, but with a very high ratio:

$$\frac{\text{Stay in desulphater}}{\text{Stay in converter}}$$

whence a very high ratio of desulphater volume to converter volume, about 40:1 for instance. There must be such decanting (or filtering) surfaces that the brines from the desulphaters be not only desupersaturated but also free from fine crystals in suspension.

The concentrated circuit receives the primary brine rich in $MgCl_2$ and in $MgSO_4$ and gives desulphated brine, a portion of which is recycled for the desulphating, and the remaining, after dilution by the washing waters, is used for completing the conversion in the diluted circuit.

*Example*

The complex cycle thus realized will appear more clearly from FIGURE 2, given as an example, which shows the quantities of liquids and their concentrations (expressed in millinormalities) of Mg, Ca and $SO_4$ in the various circuits. The first circuit, the circuit employing concentrated brine (concentrated circuit), comprises:

Two desulphaters $S_1$ and $S_2$
One soaking vat T
One converter C

The second circuit, the circuit employing diluted brine (diluted circuit), comprises:

Three converters $D_1$, $D_2$ and $D^3$
Three washers $L_1$, $L_2$ and $L_3$

The number of these devices can be varied.

We have at our disposal:

First, a source of magnesium brine 2 (concentrated sea water containing Mg as chloride and sulphate) characterized by the following contents:

Mg = 850 millinormalities
Ca = 70 millinormalities
$SO_4$ = 350 millinormalities Second, stock of desulphated brines 4 and 6 (prepared synthetically, or obtained by substituting Ca ions for a part of the Mg ions in an appropriate quantity of brine 2 and maintained in contact with gypsum crystals long enough to destroy the super-saturation in $SO_4$, or obtained from a prior operation) characterized by the following compositions:

Brine 4 { Mg = 400 millinormalities
Ca = 210 millinormalities
$SO_4$ = 40 millinormalities Brine 6 { Mg = 175 millinormalities
Ca = 420 millinormalities
$SO_4$ = 25 millinormalities and in such amounts that the desulphating volumes 4 and 6 would, respectively, represent 12 and 32 times the hourly input of brine 2 to be used for the conversion of dolomite.

*Concentrated Circuit*

One volume (1 liter) of brine 4 is introduced through pipe 8 to vat T and 48.4 grams of slaked dolomite in grain of 75 to 280 microns are soaked therein, the dolomite containing:

Mg = 680 millinormalities
Ca = 775 millinormalities

The soaking time (maintaining the grains suspended in the brine) is 6 minutes. Then, after decanting, the liquid is transferred through pipe 10 into the desulphater $S_2$ containing brine 6 and the soaked dolomite is transferred into the converter C as indicated by the line 12.

During this soaking operation, a part of the dolomite was converted according to Equation A, whereby 300 millinormalities of Mg were eleminated from the brine and substituted in the dolomite for an equivalent number of normalities of Ca primarily contained in said dolomite, while 295 millinormalities of Ca passed into the solution as $CaCl_2$ and are now available for desulphating operations in desulphaters $S_1$ and $S_2$, bringing about enough Ca to satisfy Equation B and also an excess capable of starting the insolubilization of $SO_4$ ions by homoionic effect in concentrated medium.

The brine transferred from vat T to desulphater $S_2$ contains:

Mg=100 millinormalities
Ca=505 millinormalities
$SO_4$=35 millinormalities

Therefore, it is largely supersaturated in $SO_4$ ions since, in such a concentrated brine containing about 0.5 normality of Ca ions, the solubility of the $SO_4$ ions would be only 18 millinormalities.

In spite of said supersaturation, and owing to the short contact duration (6 minutes) in the vat T, the contamination of dolomite by $CaSO_4.2H_2O$ is very small (5 millinormalities).

In converter C, the soaked dolomite, coming from vat T, is put in suspension in brine taken from desulphater $S_2$ and, for 15 minutes, this same brine is continuously introduced through pipe 14 up to a total volume of 2 liters.

Afterwards, the decanting operation is carried out. The brine which has reacted on dolomite is sent back through pipe 16 to desulphater $S_2$ and the partially converted dolomite is transferred to converter $D_1$.

During his operation in converter C, 2(175−100)=150 millinormalities of Mg disappeared from the two volumes of brine utilized and were substituted by an equivalent number of Ca millinormalities initially present in the dolomite, while 150 $CaCl_2$ millinormalities were added to the 295 millinormalities from the preceding soaking operation in order to increase the homoionic effect of insolubilization of $SO_4$ ions in desulphater $S_2$.

As the brine which has reacted in converter C returns to desulphater $S_2$, it does not leave the concentrated circuit. Its composition is:

Mg=100 millinormalities
Ca=495 millinormalities
$SO_4$=25 millinormalities

Therefore, is is also supersaturated in $SO_4$ ions since, in such a concentrated brine containing about 0.5 millinormality of Ca ions, the solubility of the $SO_4$ is about 18 millinormalities, as hereinabove indicated.

However, the supersaturation is lower than in vat T and, despite a longer contact duration (15 minutes instead of 6), the dolomite contamination is not noticeable.

On the other hand, the dolomite transferred from converter C to converter $D_1$ as indicated by line 18 leaves the concentrated circuit where it has finally lost 295+150=445 millinormalities of Ca, that is, 445/775=57% of its initial content.

In compensation, is has gained 300+150=450 millinormalities of Mg, that is, 450/680=66% of its initial content.

Owing to its coupling with vat T and converter C, desulphater $S_2$ receives 1+2=3 volumes respectively from them, whereas it gives back only 2 volumes to converter C. Now, brine 6 is unfit for soaking for it is too poor in Mg. Therefore, the excess volume (1 liter) is returned, not to vat T, but to desulphater $S_1$ through pipe 20.

Thus, the whole arrangement, vat T, converter C and desulphaters $S_1$ and $S_2$, which forms the concentrated circuit, is temporarily balanced as regards its internal outputs, but it is short in Mg since 450 millinormalities of Mg have disappeared from the brine to be replaced by the same amount of Ca ions from dolomite and it shows an excess of Ca since, for 445 millinormalities of Ca passed in solution as $CaCl_2$, the crystallization as gypsum has respectively removed from desulphaters $S_1$ and $S_2$ 280+25=305 millinormalities only. The excess is 445−305=140 millinormalities.

In order to restore the balance between Ca and Mg ions coming in and out of the whole concentrated circuit, desulphater $S_1$ is supplied with one volume of brine 2, rich in Mg and poor in Ca, and an equivalent volume of brine 4, poorer in Mg but richer in Ca than brine 2, is withdrawn from desulphater $S_1$ and feed through pipe 21 to converter $D_3$ (for the feeding of the diluted circuit). There is thus obtained:

| | | | |
|---|---|---|---|
| +1 volume brine 2 | Mg=850 | Ca= 70 | $SO_4$=350 |
| −1 volume brine 4 | Mg=400 | Ca=210 | $SO_4$= 40 |
| Difference=0 | | +450 | −140 | +310 |

The difference between 310 millinormalities of excess sulphate in the circuit and 305 millinormalities of $$CaSO_4.2H_2O$$

removed in the desulphaters $S_1$ and $S_2$ corresponds to 5 millinormalities of $CaSO_4$ which have contaminated the dolomite during the soaking operation.

For an output distribution as hereinabove, the unbalance would thus be rectified as regards the whole concentrated circuit, but it would not be solved between desulphaters $S_1$ and $S_2$ which would show the following balance:

Desulphater $S_1$:
| | | | |
|---|---|---|---|
| +1 volume | Mg=850 | Ca= 70 | $SO_4$=350 in brine 2 |
| +1 volume | =175 | =420 | = 25 from desulphater $S_2$ |
| −1 volume | =400 | =210 | = 40 to vat T |
| −1 volume | =400 | =210 | = 40 to converter $D_3$ |
| | | =280 | =280 in $CaSO_4.2H_2O$ |
| 0 | | +225 | −210 | + 15 |

Desulphater $S_2$:
| | | | |
|---|---|---|---|
| +1 volume | Mg=100 | Ca=505 | $SO_4$= 35 from vat T |
| +2 volumes | =200 | =990 | = 50 from converter C |
| −2 volumes | =350 | =840 | = 50 to converter C |
| −1 volume | =175 | =420 | = 25 to desulphater $S_1$ |
| | | = 25 | = 25 in $CaSO_4.2H_2O$ |
| 0 | | −225 | +210 | − 15 |

Therefore, to restore the balance, it is necessary to complete the moves already considered with an internal circulation between these two brines 4 and 6, giving for one volume of brine exchanged:

| | | | | |
|---|---|---|---|---|
| 1 volume | $S_1 \longrightarrow S_2$ | Mg=400 | Ca=210 | $SO_4$=40 |
| | $S_1 \longleftarrow S_2$ | =175 | =420 | =25 |
| | Differences | −225 | +210 | −15 |
| | 0 | $S_1 \longrightarrow S_2$ | $S_1 \longleftarrow S_2$ | $S_1 \longrightarrow S_2$ |

On the whole, as in details, the balances are then equalized and the internal and external outputs relating to the concentrated circuit are settled. These outputs are shown on FIGURE 2 whereon the partial balances may be read easily.

The total independence of the concentration circuit relative to the diluted circuit (which receives brine and partially converted dolomite from the former but sends back nothing to it) appears clearly on FIGURE 2, and the main point is the ability in said concentrated circuit to extract, from the dolomite utilized, all the Ca ions necessary:

(a) To satisfy the conversion of magnesium sulphate into calcium sulphate (Equation B) stoichiometrically; and (b) To introduce into the brines to be desulphated an excess of $CaCl_2$ which, by homoionic effect, lowers the $SO_4$ ions solubility to such a value that the soaking in vat T may be carried out without any excessive contamination of dolomite by $CaSO_4$ and that, after dilution of the brine from desulphater $S_1$ by the washing waters at the inlet of converter $D_3$ as described hereinafter, the conversion may be completed in a medium undersaturated in $CaSO_4$.

It is important and in accordance with the present process that this result might be obtained without any addition of make-up $CaCl_2$ from the diluted circuit, for the introduction in the concentrated circuit of dilution water, in small but frequent quantities, would modify the solubility diagram of $SO_4$ ions, even at equal concentrations in Ca ions, and thus lower the solubility margin given by the dilution of a less desulphated brine 4. This change in the solubility curve of FIGURE 1, following an admission of water into the concentrated circuit, would also increase the chances of contamination during the soaking operation in vat T.

Diluted Circuit

The partially converted dolomite from converter C is transferred into converter $D_1$ as indicated by line 18, put in suspension in exhausted brine, diluted and treated by progressive addition, in 20 minutes, of 2 volumes of diluted brine from converter $D_2$. After reaction, the brine is sent to discharge through pipe 22 and the dolomite is transferred into converter $D_2$ as indicated by line 24.

The composition of the discharged brine (point E of FIGURE 1) is Mg=35 millinormalities, Ca=265 millinormalities and $SO_4$=20 millinormalities.

It is obviously undersaturated in sulphate since in diluted brine 1:1 (point e of FIGURE 1) the $SO_4$ ions solubility is 52 millinormalities.

In converter $D_2$, the dolomite from converter $D_1$ is treated with 2 volumes of brine from converter $D_3$ added progressively in 30 minutes.

The solution resulting from the reaction, for this treating time, contains about Mg=100 millinormalities, Ca=205 millinormalities and $SO_4$=20 millinormalities (point F of FIGURE 1).

The brine is still undersaturated in $SO_4$ ions which, under these conditions, have a solubility of about 60 millinormalities (point f of FIGURE 1).

The dolomite is transferred to converter $D_3$ as indicated by line 26.

In converter $D_3$, it is put in suspension for 90 minutes with the diluted brine from the mixing of one volume of desulphated concentrated brine 4 from desulphater $S_1$ fed through pipe 21 and one volume of washing water coming from one volume of fresh water fed through pipe 28 to washer $L_3$. This brine, after passage through washers $L_3$, $L_2$ and $L_1$, is charged with soluble products (NaCl, $CaCl_2$) impregnating the magnesia grains as they come out of converter $D_3$ where the properly so-called conversion of dolomite into magnesia has been completed.

This conversion ended in a brine containing Mg=150 millinormalities, Ca=155 millinormalities and $SO_4$=20 millinormalities (point G of FIGURE 1) that is still more undersaturated than the preceding ones (in fact the theoretical solubility of $SO_4$ ions is about 70 millinormalities, point g of FIGURE 1).

The three washings in washers $L_1$, $L_2$ and $L_3$ are effected by successive suspensions of magnesia from converter $D_3$, respectively for 15, 10 and 5 minutes, in each washer with counterflowing water.

In order to avoid the bursting and the dispersion of the grains coming in contact with water, an $MgCl_2$ content above 10 millinormalities is maintained in each washer by means of controlled additions if necessary.

From washer $L_3$ are extracted, per liter of brine utilized, 92 grams of damp cake having a moisture content of 58%, that is 38.7 grams $Mg(OH)_2$ corresponding to 26.6 grams MgO.

The average decantability in the various brines utilized in the process is 4 cm./minute, which is excellent.

The undersaturation margin in $SO_4$ ions in the diluted circuit may appear too great (20 millinormalities compared to 52 possible in converter $D_1$). At first sight, it would seem that the process would allow either a lesser desulphating in desulphater $S_1$ (but in this case, the contamination during soaking would be higher) or a reduction of 50%, for example, in the amount of washing water introduced during the diluted stage, which would involve the discharge of 1.5 volumes (instead of 2) containing about Mg=47 millinormalities, Ca=350 millinormalities and $SO_4$=27 millinormalities, while for a Ca normality of 0.35 and in a less diluted brine the effective solubility would still be about 32 millinormalities of $SO_4$.

However, in the present example given by way of illustration only and in which there are only three stages of washing, this reduced quantity of washing water, sufficient to limit the contamination of the final product by $CaSO_4$, would be too small to purify the magnesia from converter $D_3$ from the soluble products (NaCl, $CaCl_2$) which impregnate it.

The Matter Balance of the process according to the present example, expressed in millinormalities, is as follows:

Magnesium:
  Mg input: 850+680 _____ 1530
  Mg eliminated in solution at discharge _____ 70 i.e. 4.6%

Mg produced or maintained in solid state ____ 1460 i.e. 95.4% that is:
    In the fines produced in vat T and converter
      C (and evacuated with the gypsum) _____ 70 i.e. 4.6%
    In the fines produced in the diluted circuit
      (recoverable in converter $D_1$) _____ 60 i.e. 3.9%} 90.8%
    In the final product (calibrated) _____ 1330 i.e. 86.9%

Ratio $\frac{\text{grains recovered}}{\text{grains + fines produced}} = \frac{1330}{1460}$ _____ 91%

Mg yield = $\frac{1330}{1530}$ _____ 87%

Calcium:
  Ca input=70+775 _____ 845
  Ca eliminated as gypsum: 280+25 _____ 305 i.e. 36%
  Ca eliminated in converter $D_1$ ($CaSO_4$:2×20) ___ 40 i.e. 4.7%} 62.9%
  Ca in solution ($CaCl_2$:2×(265−20)) _____ 490 i.e. 58.2%
  Ca as impurities (in $CaSO_4$) _____ 2.5 i.e. 0.3%}
  Ca in the product ($CaCl_2$ + undetermined:
    9−2.5) _____ 6.5 i.e. 0.8%} 1.1%

$SO_4$:
  $SO_4$ input _____ 350
  $SO_4$ eliminated as gypsum: 280+25 _____ 305 i.e. 87%
  $SO_4$ eliminated in soluble state in converter $D_1$:
    2×20 _____ 40 i.e. 11.5%
  $SO_4$ as impurities in the product _____ 2.5 i.e. 0.7%
  $SO_4$ undetermined _____ 2.5 i.e. 0.7%

The characteristics of the final product are as follows:

Ratio: CaO/MgO=9/1330×56/40 _____ 0.95%
Moisture _____ 58%
Filterability _____ Instantaneous The invention is not limited to the preferred embodiment but may be otherwise embodied or practiced within the scope of the following claims.

I claim:

1. A process of converting slaked dolomite into $Mg(OH)_2$ by employing an initial magnesium brine substantially saturated in NaCl and containing, in addition to chlorides, a substantial proportion of sulphate, which comprises mixing with said initial brine a sufficient quantity of a recycled concentrated brine rich in $CaCl_2$ than said initial brine to thereby cause the supersaturation of calcium sulphate without lowering the NaCl content of the mixture and crystallize a great part of the $CaSO_4$ in the form of gypsum in a desulphating step, removing the gypsum from its mother liquor, mixing magnesium brine mother liquor from said desulphating step with slaked dolomite in a first converting step to partially convert in concentrated medium the dolomite into $Mg(OH)_2$ and produce a concentrated brine richer in $CaCl_2$ than said mother liquor, utilizing the concentrated brine produced in said first converting step as the recycled brine which is mixed with said initial brine, removing the partially converted dolomite from said first converting step and carrying on the conversion in a second converting step by mixing it with magnesium-containing brine which is more dilute than said mother liquor and is obtained by diluting mother liquor from said desulphating step with water in order to increase the solubility of the CaSO₄ still present in the medium and avoid its precipitation, and to obtain finally a magnesium hydroxide with a very small amount of CaSO₄.

2. A process of converting slaked dolomite into Mg(OH)₂ by employing an initial magnesium brine substantially saturated in NaCl and containing, in addition to chlorides, a substantial proportion of sulphate, which comprises mixing with said initial brine in a first desulphater a sufficient quantity of a recycled concentrated brine richer in CaCl₂ than said initial brine to thereby cause the supersaturation of calcium sulphate without lowering the NaCl content of the mixture and crystallize a great part of the CaSO₄ in the form of gypsum in said first desulphater, removing the gypsum from its mother liquor, mixing part of the magnesium brine mother liquor from said gypsum crystallization step with slaked dolomite in a soaking vat to partially convert in concentrated medium the dolomite into Mg(OH)₂ and produce a concentrated brine richer in CaCl₂ than said magnesium brine mother liquor, transferring the partially converted dolomite to a first converter and mixing it with concentrated magnesium-containing brine richer in CaCl₂ than said magnesium brine mother liquor and circulating from a second desulphater through said first converter and returning to said second desulphater, feeding said second desulphater with part of the magnesium brine mother liquor from said first desulphater and with mother liquor from said soaking vat, crystallizing gypsum from the concentrated brine in said second desulphater, removing the gypsum from its mother liquor, utilizing part of the mother liquor from said second desulphater as the recycled concentrated brine which is mixed with said initial brine in said first desulphater, removing the partially converted dolomite from said first converter and carrying on the conversion in a second converting step by mixing it with magnesium-containing brine which is more dilute than said mother liquor and is obtained by diluting mother liquor from said first desulphater with water in order to increase the solubility of the CaSO₄ still present in the medium and avoid its precipitation, and to obtain finally a magnesium hydroxide with a very small amount of CaSO₄.

3. A process according to claim 2, wherein the ratio $$\frac{\text{stay in desulphaters}}{\text{stay in converter}}$$

is about 40:1.

References Cited in the file of this patent

UNITED STATES PATENTS

| | | |
|---|---|---|
| 2,082,989 | Thomsen | June 8, 1937 |
| 2,224,780 | Chesny | Dec. 10, 1940 |
| 2,373,911 | Pike | Apr. 17, 1945 |
| 2,373,912 | Pike | Apr. 17, 1945 |
| 2,759,794 | Fuschman | Aug. 21, 1956 |

UNITED STATES PATENT OFFICE
CERTIFICATE OF CORRECTION

Patent No. 3,051,552                      August 28, 1962

André Sablé

It is hereby certified that error appears in the above numbered patent requiring correction and that the said Letters Patent should read as corrected below.

Column 2, line 7, for "$CaSo_4.2H_2O$" read -- $CaSO_4.2H_2O$ --; column 4, line 36, for "stock" read -- stocks --; line 59, for "grain" read -- grains --; line 69, strike out "the", second occurrence; same column 4, line 72, for "eleminated" read -- eliminated --; column 5, line 29, for "his" read -- this --; line 55, for "is is" read -- it is --; line 57, after "$SO_4$" insert -- ions --; same column 5, line 67, for "is" read -- it --; column 6, line 17, for "feed" read -- fed --; line 60, for "concentration" read -- concentrated --; column 8, line 1, for "possibile" read -- possible --; line 59, for "rich" read -- richer --.

Signed and sealed this 18th day of December 1962.

(SEAL)
Attest:
ERNEST W. SWIDER                          DAVID L. LADD
Attesting Officer                           Commissioner of Patents